United States Patent
Young

[19]

[11] Patent Number: 5,988,546
[45] Date of Patent: Nov. 23, 1999

[54] FISHING REEL TENSION BAIL MECHANISM

[75] Inventor: John Newton Young, Fairfax, Calif.

[73] Assignee: Charles C. Worth Corporation, San Rafael, Calif.

[21] Appl. No.: 09/073,127

[22] Filed: May 5, 1998

Related U.S. Application Data

[60] Provisional application No. 60/045,879, May 5, 1997.

[51] Int. Cl.$^6$ .................................................. A01K 89/01
[52] U.S. Cl. ........................................... 242/232; 242/241
[58] Field of Search ..................................... 242/231, 232, 242/233, 241

[56] References Cited

U.S. PATENT DOCUMENTS

| | | |
|---|---|---|
| 4,676,450 | 6/1987 | Carpenter . |
| 4,747,559 | 5/1988 | Hitomi . |
| 4,848,695 | 7/1989 | Kaneko . |
| 4,921,187 | 5/1990 | Yamaguchi et al. ..................... 242/232 |
| 4,923,140 | 5/1990 | Yamaguchi et al. . |
| 4,941,626 | 7/1990 | Carlsson ................................... 242/231 |
| 5,669,565 | 9/1997 | Zurcher et al. .......................... 242/232 |

*Primary Examiner*—Katherine A. Matecki
*Attorney, Agent, or Firm*—Virginia H. Meyer, Esq.; Mark J. Spolyar, Esq.

[57] ABSTRACT

The present invention provides an improved fishing reel rotor-mounted bail system. More specifically, the present invention provides a bail system wherein a tension spring is pivotally inserted at a first end to a rotor arm and at a second end to a bail banjo or bail hinge such that the tension spring applies a tensile force or moment to the bail banjo or hinge thereby biasing the bail mechanism in either the open or closed position. More specifically, the present invention provides a fishing reel having an improved tension bail mechanism, comprising a bail wire assembly pivotable relative to first and second rotor arms between a first closed retrieving position and a second open casting position, and a bail wire assembly bias mechanism, comprising a bail spring, where the first end of the bail spring attaches to a rotor arm, and the second end of the bail spring attaches to the bail banjo or the bail hinge such that the bail spring applies a tensile moment to the bail banjo or hinge thereby biasing the bail wire assembly in either the first closed position or the second open position. There are two embodiments of the present invention wherein the spring biasing and bail trip members are located in the same rotor arm to reduce the rotational balance problems associated with the prior art.

18 Claims, 10 Drawing Sheets

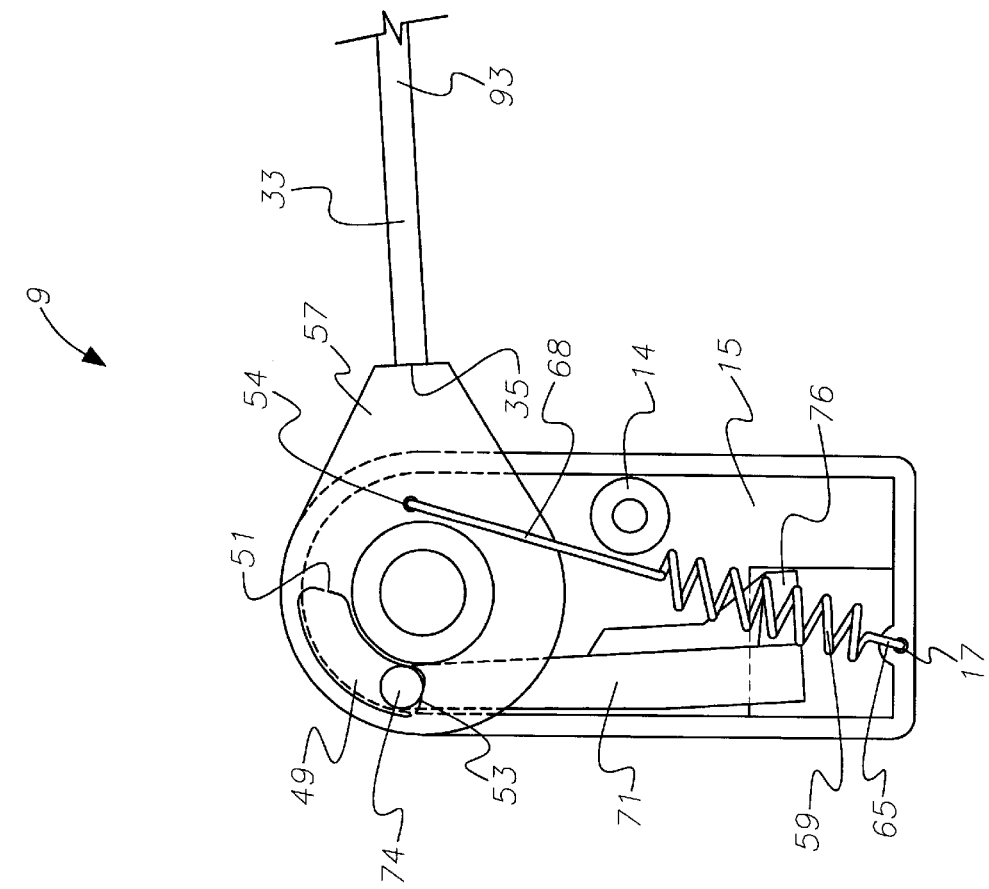
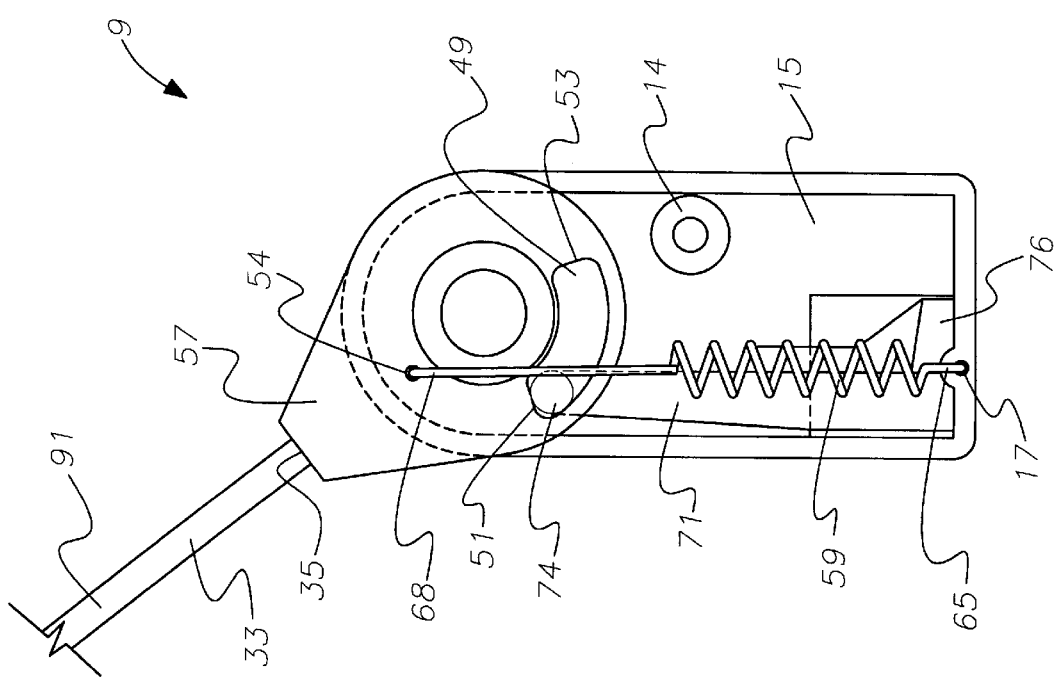

FISHING REEL TENSION BAIL MECHANISM

CROSS REFERENCES TO RELATED APPLICATIONS

This application claims the benefit of U.S. Provisional Application No. 60/045,879 filed May 5, 1997.

BACKGROUND OF THE INVENTION

1. Field of the Invention

The present invention relates to fishing reels that wind line on a spool. More particularly, the present invention relates to a bail bias mechanism configured to selectively align line onto a spool when in a closed retrieval position or to release line from the spool, when in an open casting position.

2. Description of the Prior Art

Fishing reels are customarily fitted with a rotating member known as a rotor, on which two integral rotor arms carry a bail mechanism. The use of selective bail mechanisms on fishing reels to control line alignment on the spool is known. These mechanisms are commonly referred to in the art as bail systems or bail mechanisms. Prior art bail systems are taught in U.S. Pat. No. 4,676,450 issued to Carpenter et al., U.S. Pat. No. 4,747,559 issued to Hitomi, U.S. Pat. No. 4,848,695 issued to Kaneko, and U.S. Pat. No. 4,923,140 issued to Yamaguchi et al. These and other prior art bail systems share a common function, i.e. to pivot a line guide over the face of a related spool and bias the line guide in one of two positions relative to the spool. In the closed position, the line guide controls winding of the fishing line on the spool as the fisherman cranks the reel handle. In the open position, the line guide allows line to be freely released from the spool as the fisherman casts a lure attached to the free end of the fishing line. These and other prior art bail systems also share a common disadvantage in that their assembly is quite intricate, involving a complex assembly of springs and levers which are costly to make and assemble. These prior art bail systems use a compressed biasing spring and moveable cam levers to press and hold the bail wire assembly in either the open or closed positions. Specifically, the biasing spring pushes against the bail banjo or bail hinge of the bail wire assembly to hold the bail wire assembly in either the open or closed position.

Furthermore, to simplify the assembly of the rotors, many known bail systems install the biasing spring means in one of the rotor arms, and install the moveable cam lever in the other rotor arm. This configuration of spring and lever parts in separate rotor arms upsets the rotational balance of the combination of the rotor and bail system, causing the reel to jiggle as the fisherman cranks the reel to retrieve line. To overcome this fault, prior art fishing reels employ critically positioned counterweights positioned on the rotor to counteract the unbalanced condition.

While the prior art bail mechanisms fulfill their respective objectives and requirements, they do not describe or suggest a tension spring bail mechanism, wherein a tension spring biases the bail mechanism in both the open and closed positions, by applying a pulling force rather than a pushing force to the components of the bail assembly. The use of the tensioning spring allows for a bail mechanism having simple, easy-to-assemble parts. The invention also allows for the components of the bail wire biasing mechanism to be placed in the rotor arm located on the opposite side of the heavier side of the bail, thereby substantially reducing the need for counter weights.

SUMMARY OF THE INVENTION

The present invention provides an improved fishing reel rotor-mounted bail system. More specifically, the present invention provides a bail system wherein a tension spring is pivotally inserted at a first end to a rotor arm and at a second end to a bail banjo or bail hinge such that the tension spring applies a tensile force or moment to the bail banjo or hinge thereby biasing the bail mechanism in either the open or closed position. More specifically, the present invention provides a fishing reel having an improved tension bail mechanism, comprising a bail wire assembly pivotable relative to first and second rotor arms between an open casting position and a closed retrieving position, and a bail wire assembly bias mechanism, comprising a bail spring, where the first end of the bail spring attaches to a hole in the rotor arm, and the second end of the tension spring attaches to a hole in the bail banjo or bail hinge such that the bail spring applies a tensile moment to the bail banjo thereby biasing the bail wire assembly in either the open casting position retrieval position or the closed retrieval position. The use of the present invention allows for one embodiment of the present invention wherein the spring biasing and bail trip members are located in the same rotor arm to reduce the rotational balance problems associated with the prior art.

The exact configuration of the bail spring means is not critical to the invention. The bail spring means must only be capable of supplying a tensile force sufficient to bias and hold the bail wire assembly in either the open casting position or closed retrieval position. The bail spring in one preferred embodiment is a common coil spring. The use of a coil spring provides a bail system with greater longevity than prior art bail systems using non-coil spring biasing means. In another embodiment of the present invention, the bail spring comprises an elastic material such as a rubber band.

OBJECTS OF THE INVENTION

It is an object of the present invention to provide a bail system that is simple in design and quick to assemble.

It is another object of the invention to provide a bail system that permits fewer parts in the total rotor and bail assembly.

It is another object of the invention to provide a design that improves the operating lifetime of the bail operation.

It is a further object of the invention to provide a bail that is easy to access and service.

Another object of the present invention is to provide a bail mechanism whose components are positionable in a single rotor arm to reduce the rotational imbalance of the rotor.

Another object of this invention is to provide a bail tripping system that will function in either direction of rotor rotation.

Yet another object of this invention is to provide a reel forward body plate that provides different trip functionality between the two directions of rotor rotation.

BRIEF DESCRIPTION OF THE DRAWINGS

FIG. 3a & b. FIG. 3a is a front view of the rotor arm of FIG. 2 with the bail wire in the open casting position. FIG. 3b is a front view of the rotor arm of FIG. 2 with the bail wire is in the closed retrieving position.

FIG. 5a is a front view of the rotor arm of FIG. 4 with the bail in the open casting position.

FIG. 6a is a side view of a conventional reel forward plate and an associated trip arm.

FIG. 8a is a front view of the first rotor arm having the bail bias assembly mechanism of a third preferred embodiment of the invention in the open casting position.

FIG. 10a is a front view of the first rotor arm having the bail bias assembly mechanism of a fourth preferred embodiment of the invention in the open casting position.

The same reference numbers refer to the same parts throughout the various Figures.

DETAILED DESCRIPTION OF A FIRST PREFERRED EMBODIMENT

As the various Figures show, the present invention provides a fishing reel having an improved tension bail mechanism.

Figure 1:
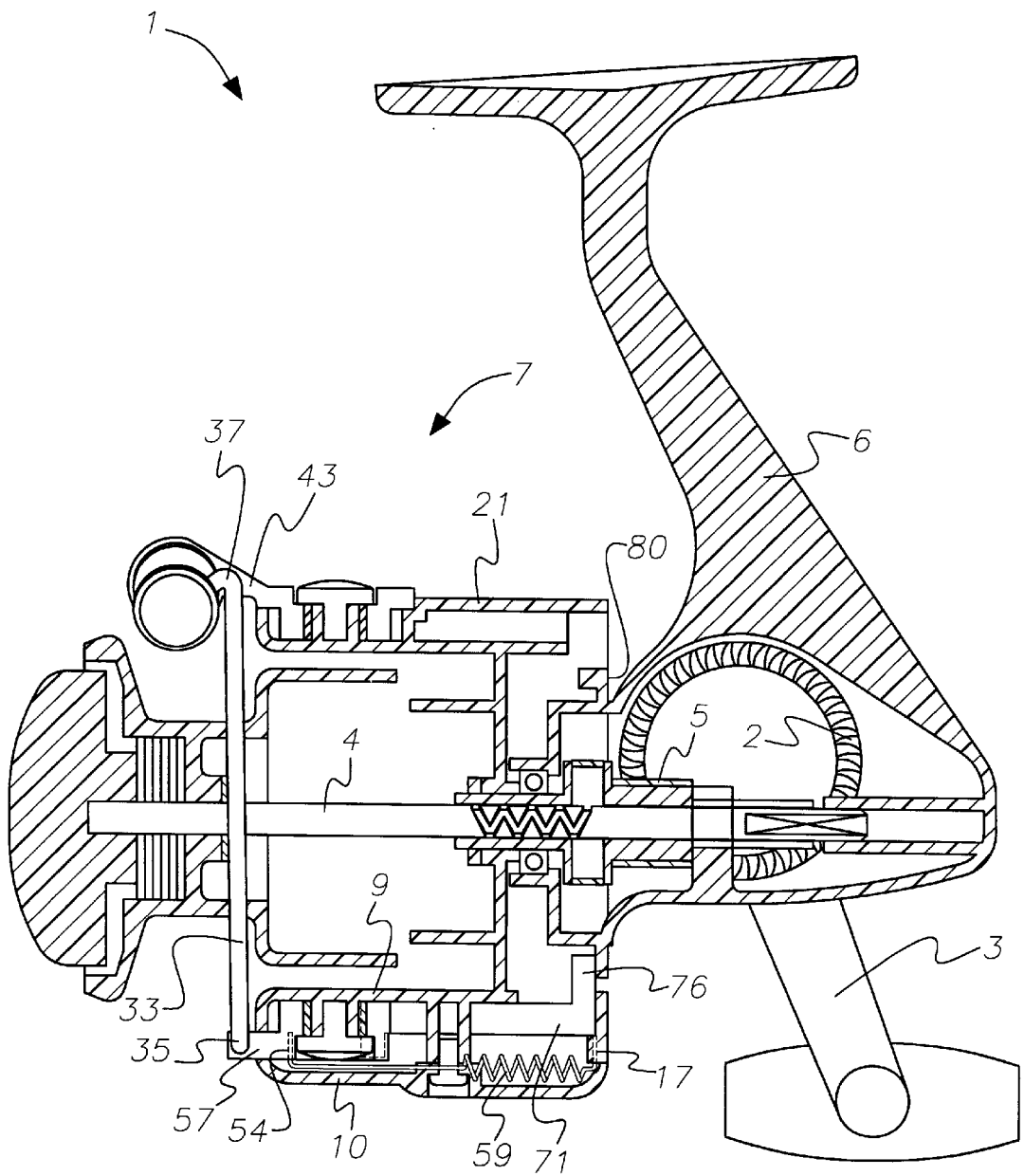
FIG. 1 is a cross-sectional view of a fishing reel.

FIG. 1 shows reel 1 having a reel body 6, and a main gear 2 journaled therein and crank 3 attached to main gear 2. Main shaft 4 has pinion 5 slidably and rotatably mounted thereto. Pinion 5 engages main gear 2 such that pinion 5 rotates as a fisherman turns crank 3. Rotor 7 is fixed to pinion 5 to rotate therewith. Rotor 7 has first rotor arm 9 and second rotor arm 21. Banjo 57 is pivotally attached to first rotor arm 9 and bail hinge 43 is pivotally attached to second rotor arm 21. Bail wire 33 has a first end 35 and a second end 37. First bail wire end 35 is attached to banjo 57. Second bail wire end 37 is attached to bail hinge 43. Bail spring 59 is pivotally inserted at a first end into hole 17 in first rotor arm 9 and at a second end into hole 54 of banjo 57. FIG. 1 shows trip arm 71 and reel forward body plate 80 of the bail trip mechanism.

Figure 2:
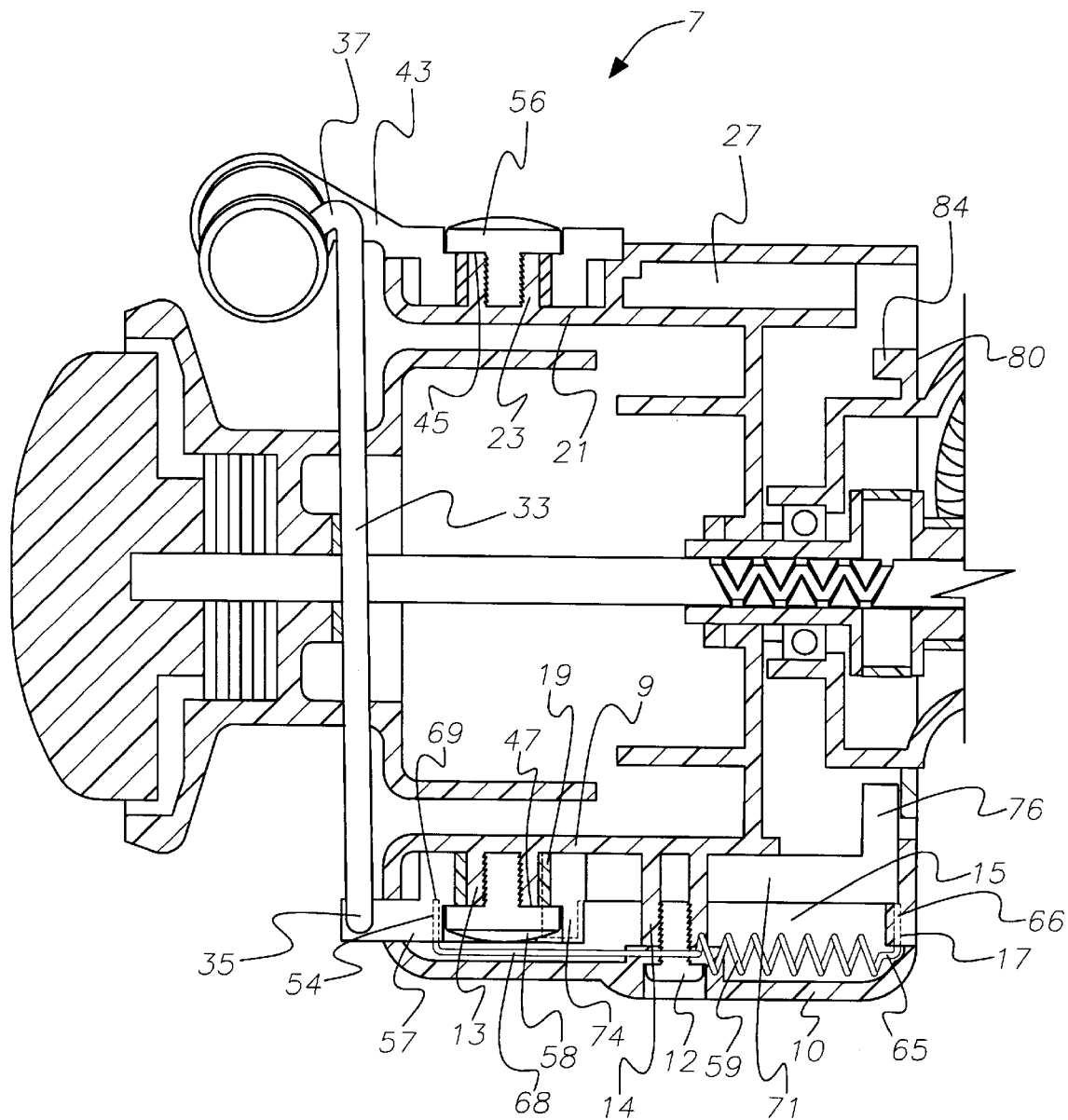
FIG. 2 shows a partial cutaway of the complete rotor and bail bias mechanism of a first preferred embodiment of the patent.

FIG. 2 is a cross sectional view of the complete rotor and bail mechanism of a first preferred embodiment of the invention. First rotor arm 9 has cavity 15 and banjo hinge tube 13 with internal threads. Banjo 57 is affixed to first end 35 of bail wire 33 in a conventional manner and is pivotally journaled over banjo hinge tube 13 by means of bushing 19. Banjo screw 58 threadably engages banjo hinge tube 13 to position banjo screw head internal stop-face 47 to hold banjo 57 pivotally fixed but not slidably fixed to rotor arm 9 in a conventional manner. (See FIG. 2.)

Bail spring 59 has first end and second end. The first end of bail spring 59 is shaped with bail spring extension 65 having bail spring insert arm 66. The second end of bail spring 59 is shaped with bail spring extension 68 having bail spring insert arm 69. Bail spring 59 is a tension spring of any elastic material or design, such as a metal coil spring or a band of rubber.

FIG. 3a and b are a front view of first rotor arm 9. FIG. 3a shows bail wire 33 in first open casting position 91. FIG. 3b shows bail wire 33 in second closed retrieving position 93. Banjo 57 is formed with hole 54. First rotor arm 9 is formed with hole 17. Bail spring 59 is assembled to the face of banjo 57 farthest from the rotor center with first bail spring insert arm 66 engaged in rotor arm hole 17 and second bail spring insert arm 69 pivotally engaged in bail hinge hole 54. Bail spring 59 is assembled as described under tension to bias the pivotal position of banjo 57 to maintain the bail wire assembly in the open casting position 91 or the closed retrieving position 93.

Further, bail screw 56 threadably engages bail tube 23 to position bail screw head internal stop-face 45 to hold bail hinge 43 pivotally fixed but not slidably fixed to rotor arm 21 in a conventional manner. (See FIG. 2.)

The pivotal movement of banjo 57 is transferred to bail hinge 43 through bail wire 33 in a conventional manner. Because both bail spring 59 and bail tripping means are contained within first rotor arm 9 as described above, there is no need for second rotor arm 21 to be shaped with a separate rotor arm cover. Therefore, second rotor arm 21 is shaped as one complete piece with cavity 27 to permit a possibly required counterweight to be fixed therein. (See FIG. 2.)

In actual use, the bail mechanism may be set to the open casting position 91 by manual manipulation of the bail wire 33. As the fisherman manually sets bail wire 33 to open casting position 91 (see FIG. 3a), second bail spring insert arm 69 of bail spring 59 is moved past bias neutral point of the spring bias mechanism into open casting position 91 bias of the bail wire assembly. In the open casting position 91, bail spring 59 then provides a tensile moment to maintain bail wire assembly in open casting position 91, as shown in FIG. 3a.

Next, provided in the fishing reel of the first preferred embodiment is the bail trip mechanism. In operation, the bail trip mechanism drives bail spring 59 from open casting position 91 past bias neutral point of the spring bias mechanism into closed retrieval position 93 bias of the bail wire assembly, as shown in FIGS. 3a and 3b. In closed retrieval position 93, the bail spring 59 then provides a tensile moment to maintain bail wire 33 in closed retrieval position 93.

Trip arm 71 is a rigid member with a main body having a first end having insert pin 74, and a second end having transfer arm 76. Trip arm transfer arm 76 is formed to have slider face 78. (See FIG. 6a & b.) As shown in FIG. 3a and b, banjo 57 is formed with radial cutout 49. Banjo radial cutout 49 has first and second opposite end surfaces 51 and 53. Trip arm 71 is assembled to have insert pin 74 engaged within banjo radial cutout 49 and the main body of trip arm 71 passing through cavity 15 of first rotor arm 9, positioning transfer arm 76 proximate to reel forward body plate 80. (See FIG. 2.)

FIG. 3a shows bail wire assembly held in open casting position 91. Banjo 57 is pivotally biased by bail spring 59 to press radial cutout surface 51 downward against trip arm first end insert pin 74 to hold the bail wire assembly in open casting position 91.

As rotor 7 is turned in a conventional manner, cam 84 engages transfer arm 76 to urge trip arm 71 in an upward direction to press trip arm insert pin 74 against radial cutout surface 51 to urge bail hinge 43 into pivotal rotation. As banjo 57 is forced to pivot, first rotor arm hole 17 passes bias neutral point whereupon spring 59 takes over the pivotal bias and urges banjo 57 toward closed retrieval position 93. (See FIG. 3a & b.)

The shape of trip arm 71 prohibits trip arm insert pin 74 from staying pressed against radial cutout surface 51 as bail spring 59 takes over the pivotal bias. Due to the pivotal bias of bail spring 59, banjo 57 continues pivoting until radial cutout surface end 53 presses against trip arm insert pin 74. Trip arm 71 is stopped in its upward movement clear of trip cam 84 when trip arm 71 reaches the upper wall limit of first rotor arm cavity 15 to hold banjo 57 in closed retrieval position 93 against the bias pressure of bail spring 59. (See FIG. 3a & b.) Other conventional means may also be employed to stop the pivotal movement of banjo 57 in closed retrieval position 93.

Figure 6A:
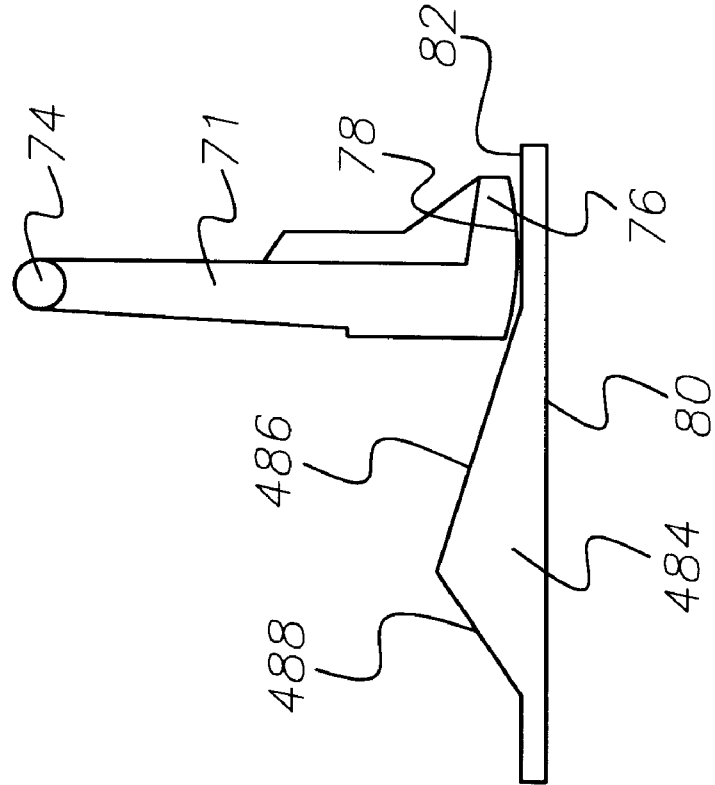
FIG. 6a & b.

Referring to FIG. 6a, conventional reel forward body plate 80 has slider face 82 and trip cam 84 having only one cam face 86. Conventional forward body plates have a single direction bail trip function. Forward body plate 80 is integral to reel body 1 in a conventional manner. (See FIG. 1.) As rotor 7 is turned in a conventional manner, trip arm 71 engages trip cam 84 at slider face 82.

Finally, first rotor arm cover 10 is held fixed to rotor arm 9 by screw 12 threadably engaged in internal threads of support tube 14. Rotor cover 10 is shaped to allow unrestrained movement of the bail mechanism and also to prevent bail spring 59 from disengaging from either first rotor arm hole 17 or banjo hole 54. (See FIG. 2.)

When bail hinge 43 is shaped to have the same spring engaging hole and radial cutout as banjo 57, and rotor arm 21 is shaped to have the same spring engaging hole, cavity, and support tube as rotor arm 9, the bail wire bias assembly mechanism and the bail trip means of the first preferred embodiment of the invention may be placed in rotor arm 21 instead of rotor arm 9. When the preferred embodiment of the invention is placed in rotor arm 21, there is no need for rotor arm 9 to be shaped with a separate rotor cover. Therefore, rotor arm 9 may be shaped as one complete piece with a cavity to permit a possibly required counterweight to be fixed therein.

DETAILED DESCRIPTION OF A SECOND PREFERRED EMBODIMENT

Figure 4:
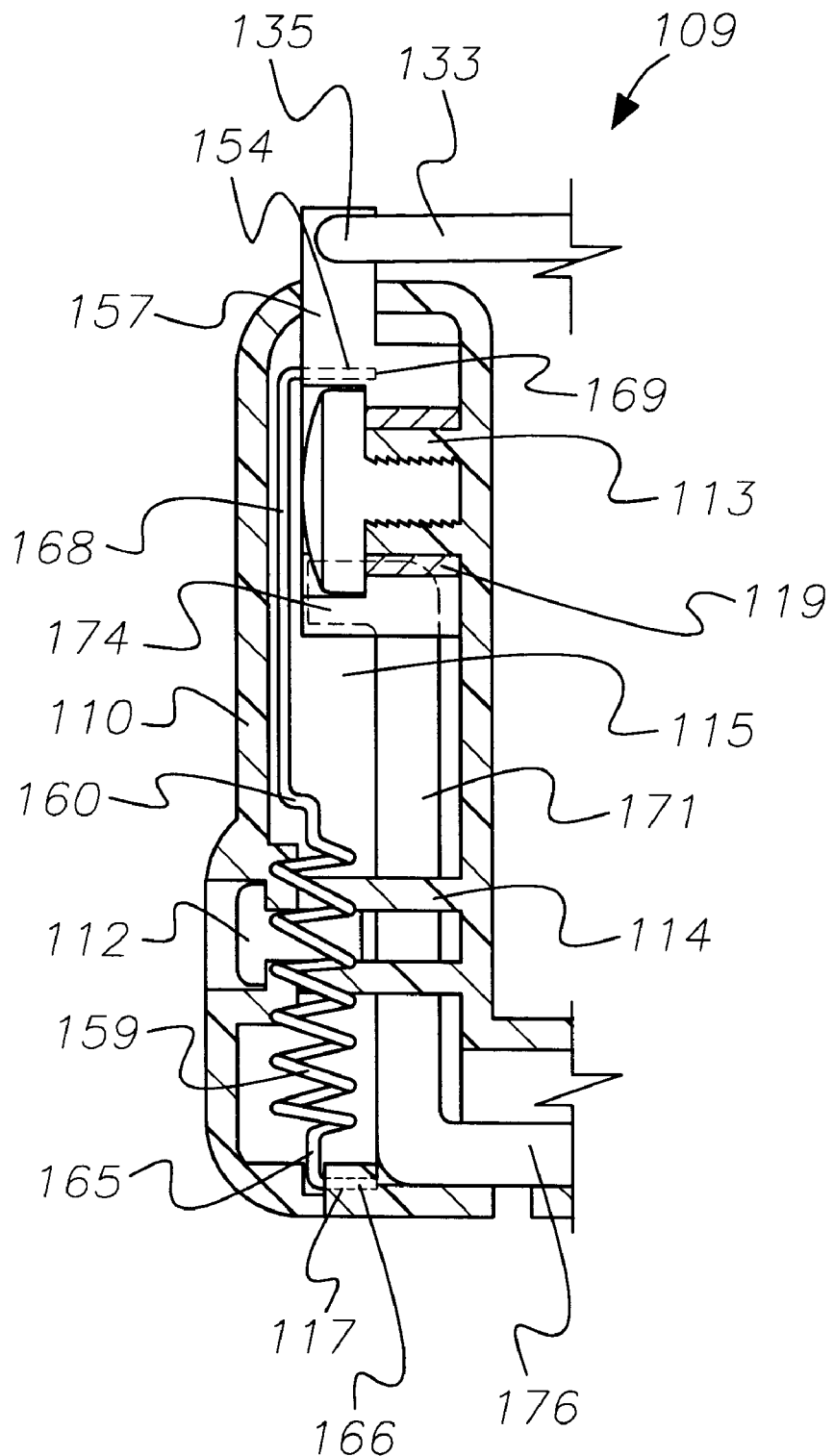
FIG. 4 shows a side view, partial cutaway of the rotor arm and bail bias mechanism of a second preferred embodiment of the patent.
Figure 5B:
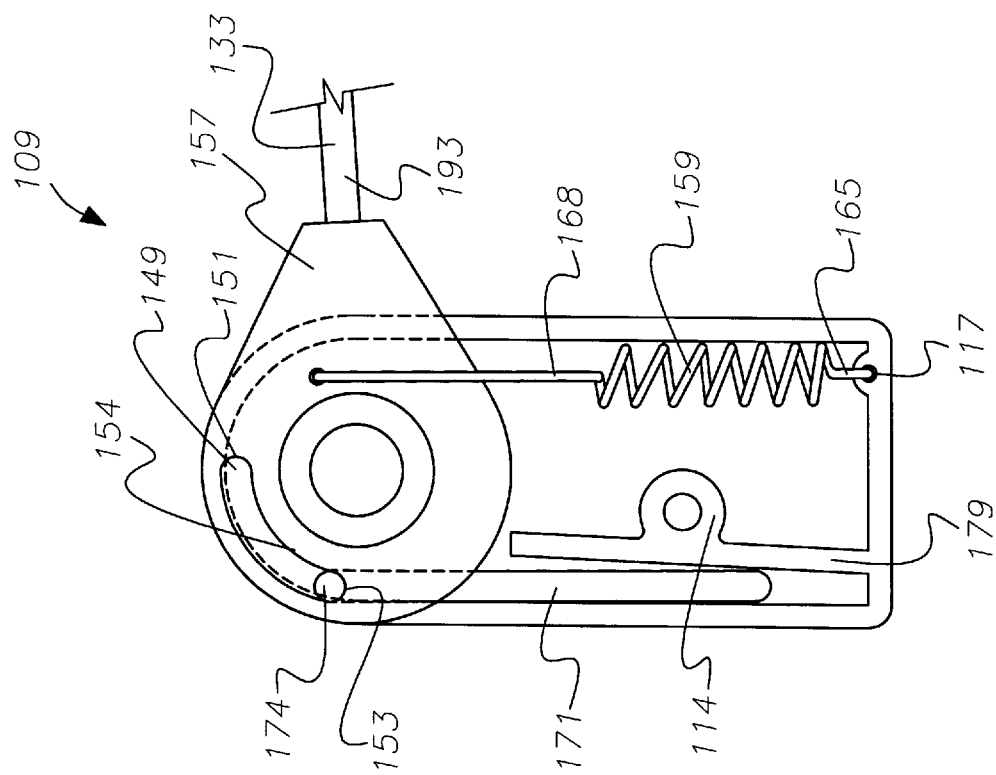
FIG. 5b is a front view of the rotor arm of FIG. 4 with the bail in the closed retrieving position.
Figure 5A:
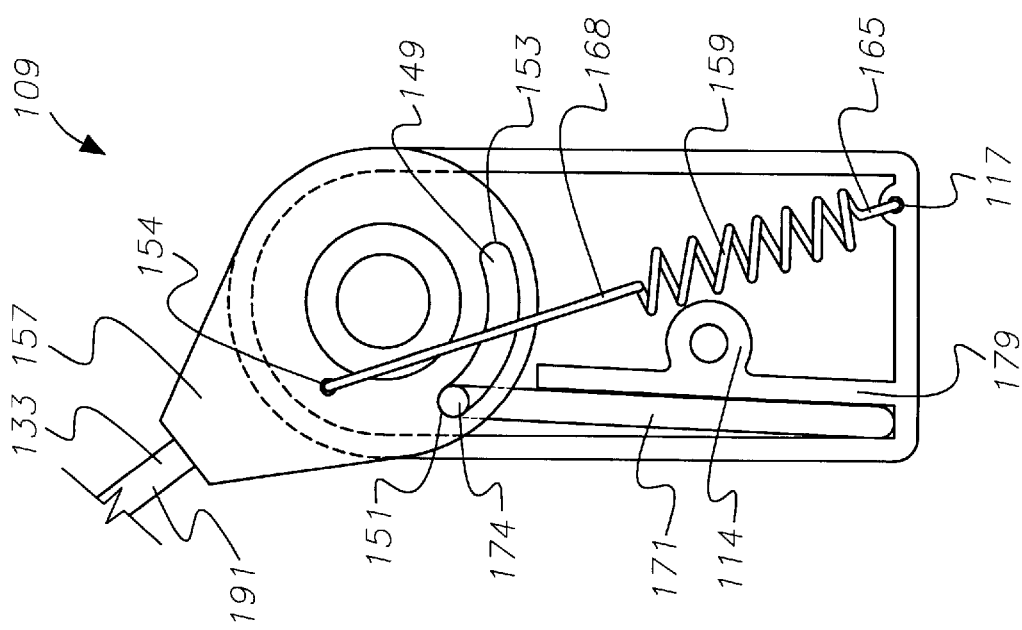
FIG. 5a & b.

The second preferred embodiment teaches possible modifications, while employing the identical principles of the first embodiment, of the invention. Specifically, as shown in FIGS. 4 and 5a & b, trip arm 176 is formed from a rigid piece of wire to reduce overall rotor arm size requirements. Retaining wall 179 is formed as an integral part of first rotor arm 109 and serves to guide overall movement of trip arm 171. Furthermore, rotor hole 117 is repositioned to permit relocation of support tube 114 to a more central position within the profile of rotor arm 109, relative to rotor hole 117 of the first preferred embodiment. (See FIGS. 5a & b.) Bail spring 159 has bend 160 to permit positioning of spring 159 closer to the rotational center of the rotor and to permit a thinner overall construction of rotor arm 109. (See FIG. 4.)

When bail hinge 43 is shaped to have the same spring engaging hole and radial cutout as banjo 57, and rotor arm 21 is shaped to have the same spring engaging hole, cavity, banjo tube, and retaining wall as rotor arm 9, the bail wire bias assembly mechanism and the bail trip means of the second preferred embodiment of the invention may be placed in rotor arm 21 instead of rotor arm 9. When the preferred embodiment of the invention is placed in rotor arm 21, there is no need for rotor arm 9 to be shaped with a separate rotor cover. Therefore, rotor arm 9 may be shaped as one complete piece with a cavity to permit a possibly required counterweight to be fixed therein.

Otherwise, the configuration and assembly of the second preferred embodiment is substantially the same as the first preferred embodiment. Reference, therefore, should be made to the description of the first preferred embodiment.

DETAILED DESCRIPTION OF A THIRD EMBODIMENT

Figure 7:
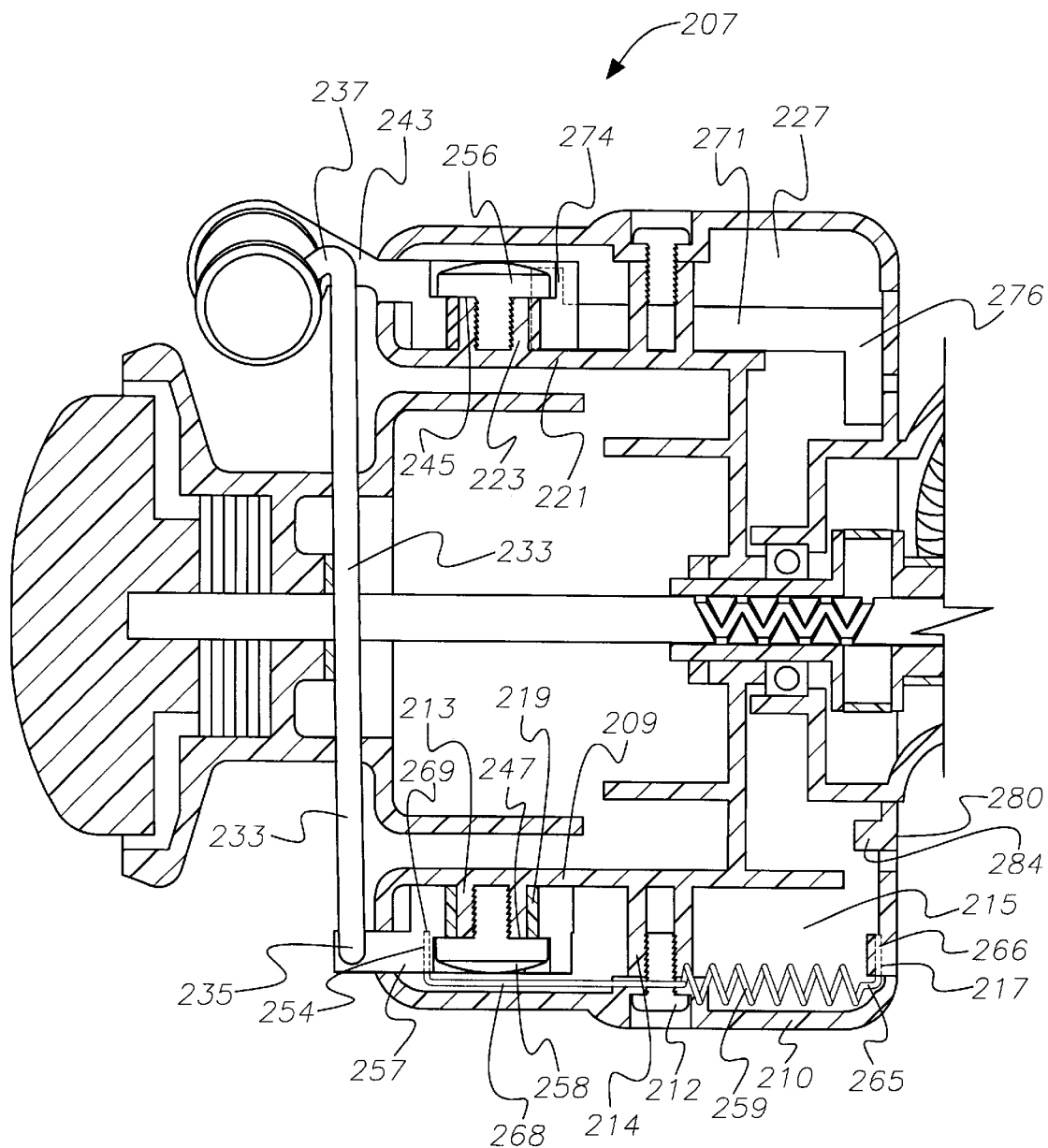
FIG. 7 shows a partial cutaway of the complete rotor and bail bias mechanism of a third preferred embodiment of the patent.

The third preferred embodiment teaches possible modifications, while employing the identical principles of the first embodiment of the invention. The bail wire bias assembly and the bail trip mechanism of the first preferred embodiment may be placed in separate rotor arms. FIG. 7 shows the bail wire bias assembly in rotor arm 209 and the bail trip mechanism in rotor arm 221.

The bail wire bias assembly is placed in rotor arm 209 as described above for the first embodiment of the invention. (See FIG. 7.) Banjo screw 258 threadably engages banjo hinge tube 213 to position bail screw head internal stop face 247 to hold banjo 257 pivotally fixed but not slidably fixed to rotor arm 209 in a conventional manner. (See FIG. 7.)

Bail spring 259 has first end and second end. The first end of bail spring 259 is shaped with bail spring extension 265 having bail spring insert arm 266. The second end of bail spring 259 is shaped with bail spring extension 268 having bail spring insert arm 269. Bail spring 259 is a tension spring of any elastic material or design, such as a metal coil spring or a band of rubber.

Figure 8A:
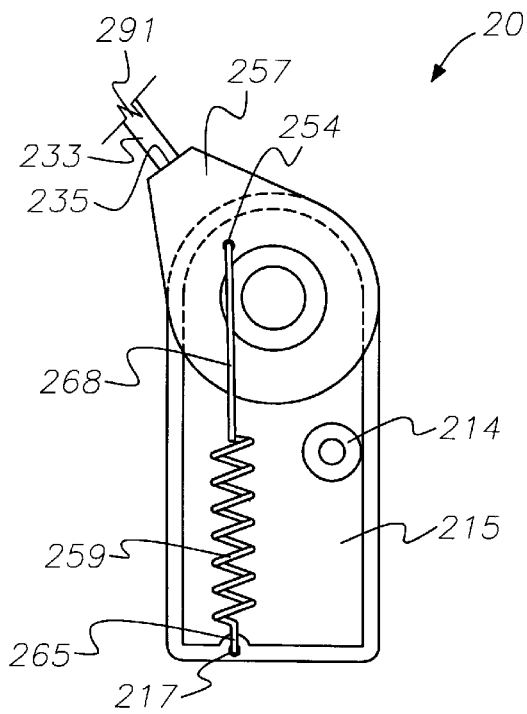
FIG. 8a, b, c & d.
Figure 8B:
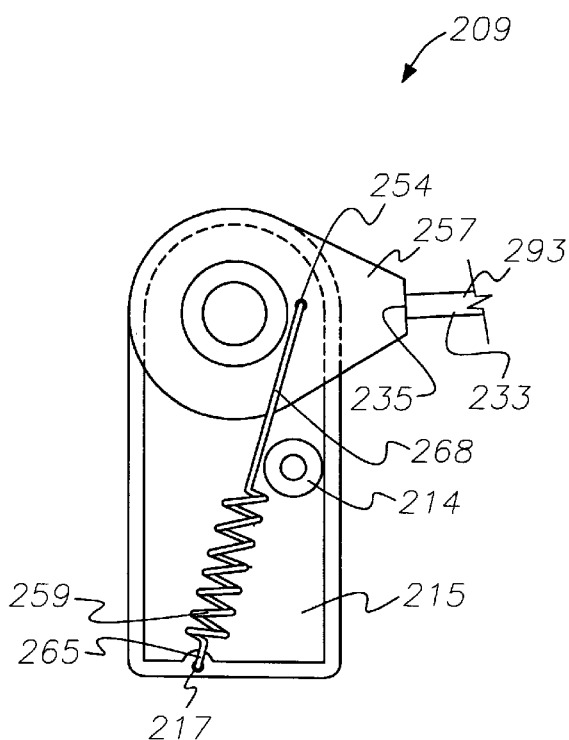
FIG. 8b is a front view of the first rotor arm having the bail bias assembly mechanism of a third preferred embodiment of the invention in the closed retrieval position.

FIG. 8a & b are a front view of first rotor arm 209. FIG. 8a shows bail wire 233 in first open casting position 291. FIG. 8b shows bail wire 233 in second closed retrieving position 293. Banjo 257 is formed with hole 254. First rotor arm 209 is formed with hole 217. Bail spring 259 is assembled to the face of banjo 257 farthest from the rotor center with first bail spring insert arm 266 engaged in rotor arm hole 217 and second bail spring insert arm 269 engaged in banjo hole 254. Bail spring 259 is assembled as described under tension to bias the pivotal position of banjo 257 to maintain the bail wire assembly in the open casting position 291 or the closed retrieving position 293.

Further, bail screw 256 threadably engages bail tube 223 to position bail screw head internal stop-face 245 to hold bail hinge 243 pivotally fixed but not slidably fixed to rotor arm 221 in a conventional manner. (See FIG. 7.)

In actual use, the bail mechanism may be set to the open casting position 291 by manual manipulation of the bail wire 233. As the fisherman manually sets bail wire 233 to open casting position 291, second bail spring insert arm 269 of bail spring 259 is moved past bias neutral point of the spring bias mechanism into open casting position 291 bias of the bail wire assembly. In the open casting position 291, bail spring 259 then provides a tensile moment to maintain bail wire assembly in open casting position 291, as shown in FIG. 8a.

Figure 8C:
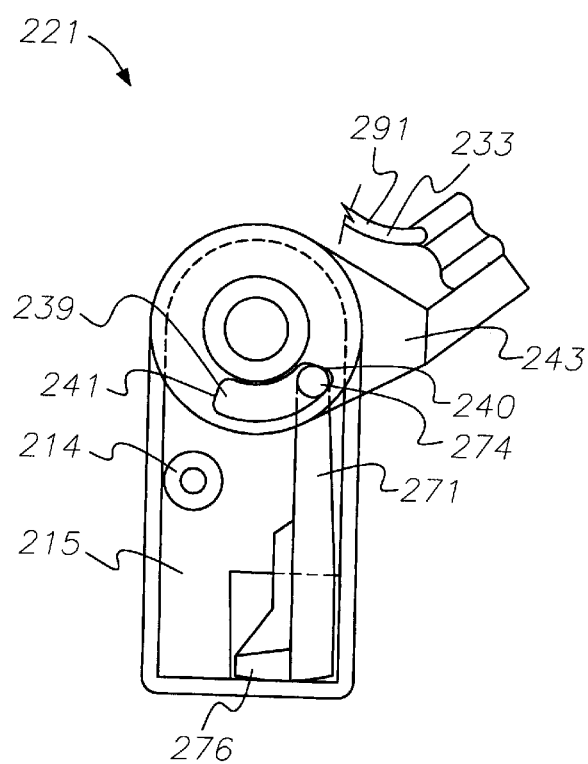
FIG. 8c is a front view of the second rotor arm in the open casting position.
Figure 8D:
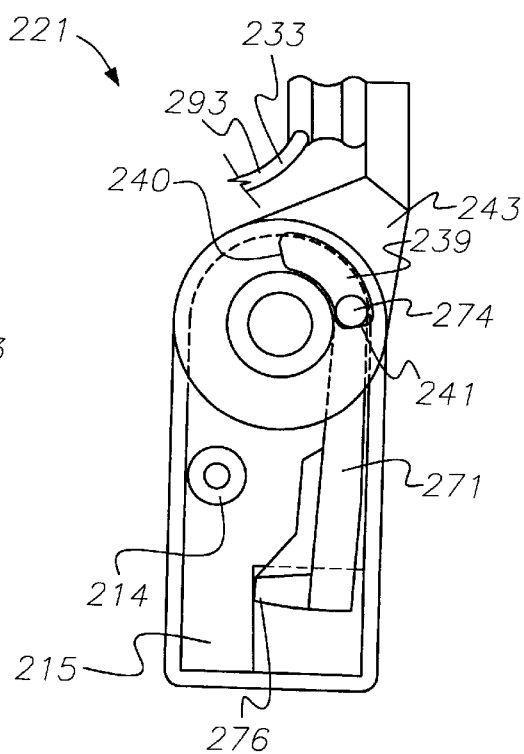
FIG. 8d is a front view of the second rotor arm in the closed retrieval position.

Next, provided in the fishing reel of the third preferred embodiment is the bail trip mechanism. In operation, the pivotal movement of bail hinge 243 is transferred to banjo 257 through bail wire 233 in a conventional manner. The pivotal movement of the bail trip mechanism transferred to banjo 257 drives bail spring 259 from open casting position 291 past bias neutral point of the spring bias mechanism into closed retrieval position 293 bias of the bail wire assembly, as shown in FIGS. 8c and 8d. In closed retrieval position 293, the bail spring 259 then provides a tensile moment to maintain bail wire 233 in closed retrieval position 293. (See FIG. 8b & d.)

Trip arm 271 is a rigid member shaped with a first end having insert pin 274, and a second end having transfer arm 276. As shown in FIG. 8c and 8d, bail hinge 243 is formed with radial cutout 239. Bail hinge radial cutout 239 has first and second opposite end surfaces 240 and 241. Trip arm 271 is assembled to have insert pin 274 engaged within bail hinge radial cutout 239 and transfer arm 276 passing through cavity 227 of rotor arm 221, positioning transfer arm 276 proximate to reel forward body plate 280. (See FIG. 7.)

FIG. 8c shows bail wire assembly held in open casting position 291. Banjo 257 is pivotally biased by bail spring 259 to hold banjo 257 in open casting position 291. The open position bias is transferred to bail hinge 243 through bail wire 233 so that radial cutout surface 240 presses downward against trip arm insert pin 274 holding trip arm 271 in open casting position 291 and transfer arm 276 engaged with forward body plate 280. (See FIGS. 7 and 8a & c.)

As rotor 207 is turned in a conventional manner, trip cam 284 engages transfer arm 276 to urge trip arm 271 in an upward direction to press trip arm insert pin 274 against radial cutout surface 240 to urge bail hinge 243 into pivotal rotation. As the pivotal movement of bail hinge 243 is transferred to banjo 257 through bail wire 233, banjo 257 is forced to pivot and pass the bias neutral point whereupon bail spring 259 takes over the pivotal bias and urges banjo 257 toward closed retrieval position 293. (See FIG. 8b & d.)

The positions of the bail wire bias assembly mechanism and bail trip mechanism may be reversed. When bail hinge 243 is shaped to have the same spring engaging hole as banjo 257, and rotor arm 221 is shaped to have the same spring engaging hole as rotor arm 209, the bail wire bias assembly mechanism of rotor arm 209 may be placed in rotor arm 221 and not rotor arm 209. When banjo 257 is shaped with the radial cut of bail hinge 243 and rotor arm 209 is shaped with cavity 227 of rotor arm 221, the bail trip mechanism of rotor arm 221 may be place in rotor arm 209 and not rotor arm 221.

Otherwise, the configuration and assembly of the third preferred embodiment is substantially the same as the first preferred embodiment. Reference, therefore, should be made to the description of the first preferred embodiment.

DETAILED DESCRIPTION OF A FOURTH EMBODIMENT

Figure 9:
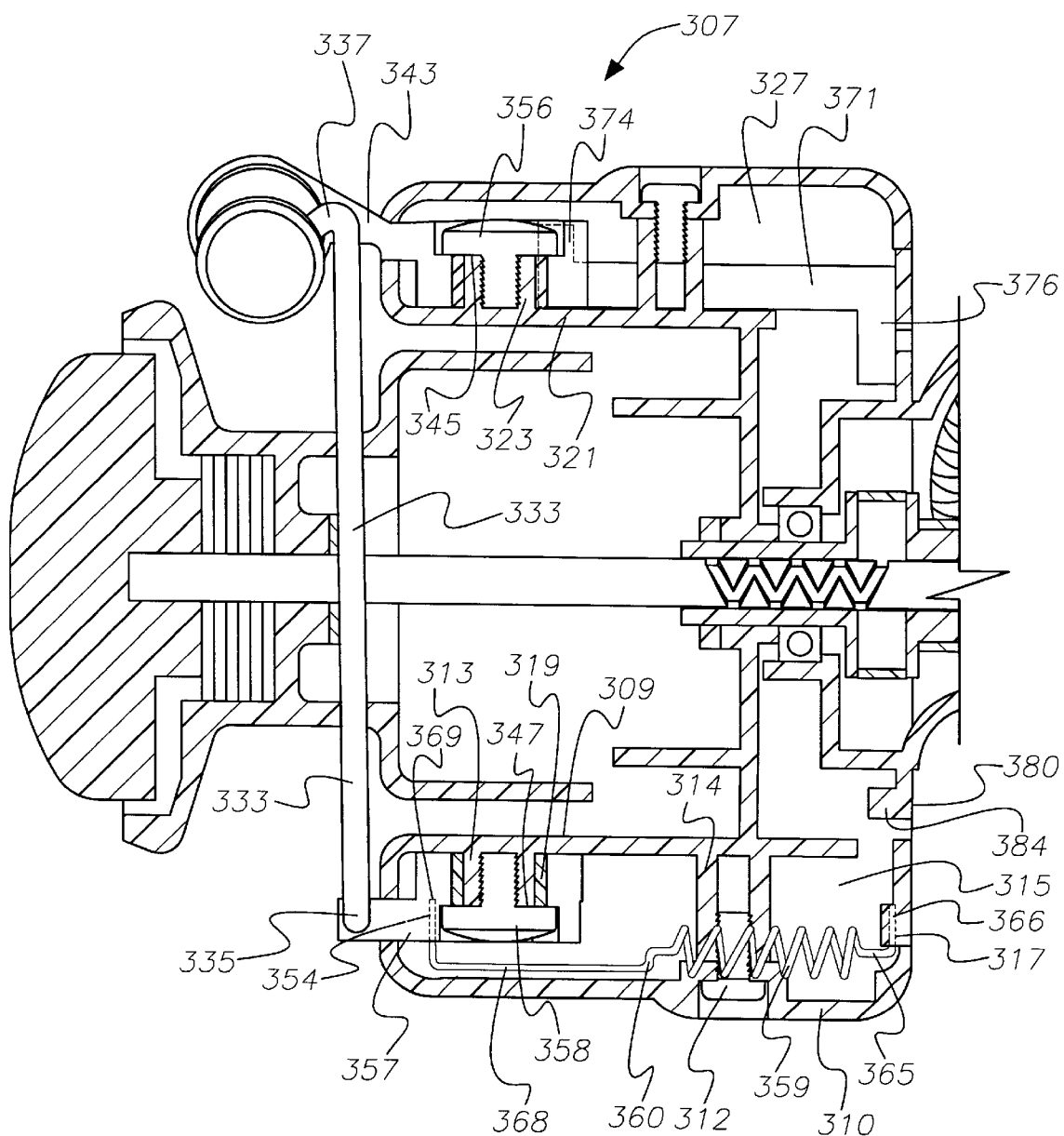
FIG. 9 shows a partial cutaway of the complete rotor and bail bias mechanism of a fourth preferred embodiment of the patent.

The fourth preferred embodiment teaches possible modifications, while employing the identical principles of the second embodiment of the invention. The bail wire bias assembly and the bail trip mechanism of the second preferred embodiment may be place in separate rotor arms. FIG. 9 shows the bail wire bias assembly in rotor arm 309 and the bail trip mechanism in rotor arm 321.

The bail wire bias assembly is place in rotor arm 309 as described above for the first embodiment of the invention. Banjo screw 358 threadably engages banjo hinge tube 313 to position the banjo screw head internal stop-face 347 to hold banjo 357 pivotally fixed but not slidably fixed to rotor arm 309 in a conventional manner. (See FIG. 9.)

Bail spring 359 has a first end and a second end. The first end of bail spring 359 is shaped with bail spring extension 365 having bail spring insert arm 366. The second end of bail spring 359 is shaped with bail spring extension 368 having bail spring insert arm 369. Bail spring 359 is tension spring of any elastic material, such as a coil spring or a band of rubber.

Figure 10A:
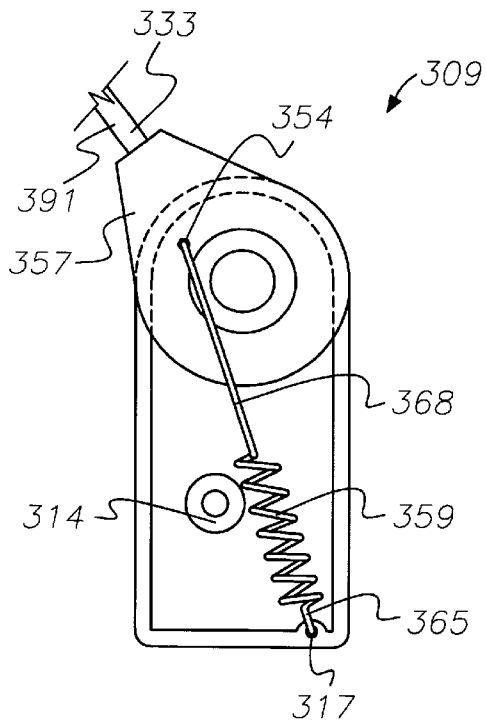
FIG. 10a, b, c & d.
Figure 10B:
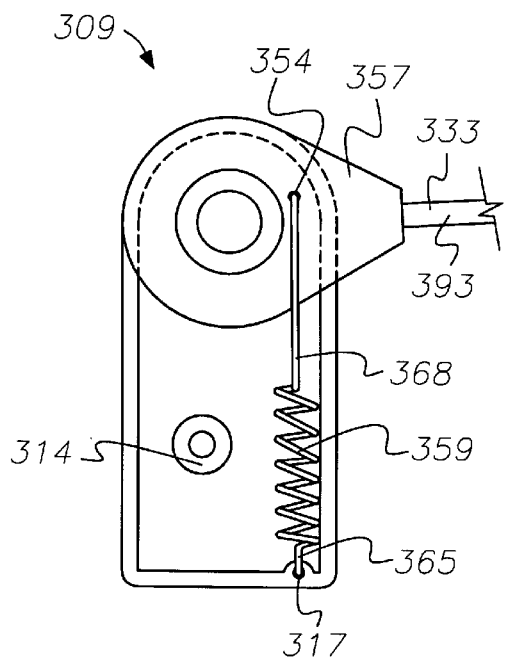
FIG. 10b is a front view of the first rotor arm in the closed retrieval position.

FIG. 10a & b are a front view of first rotor arm 309. FIG. 10a shows bail wire 333 in first open casting position 391. FIG. 10b shows bail wire 333 in second closed retrieving position 393. Banjo 357 is formed with hole 354. First rotor arm 309 is formed with hole 317. Bail spring 359 is assembled to the face of banjo 357 farthest from the rotor center with first bail spring insert arm 366 pivotally engaged in rotor arm hole 317 and second bail spring insert arm 369 pivotally engaged in banjo hole 354. Bail spring 359 is assembled as described under tension to bias the pivotal position of banjo 357 to maintain the bail wire assembly in the open casting position 391 or the closed retrieving position 293.

Further, bail hinge screw 356 threadably engages bail tube 323 to position bail screw head internal stop-face 345 to hold bail hinge pivotally fixed but not slidably fixed to rotor arm 321 in a conventional manner. (See FIG. 9.) In actual use, the bail mechanism may be set to the open casting position 391 by manual manipulation of the bail wire 333. As the fisherman manually sets bail wire 333 to open casting position 391, second bail spring insert arm 369 of bail spring 359 is moved past bias neutral point of the spring bias mechanism into open casting position 391 bias of the bail wire assembly. In the open casting position 391, bail spring 359 then provides a tensile moment to maintain bail wire assembly in open casting position 391, as shown in FIG. 10a.

Figure 10C:
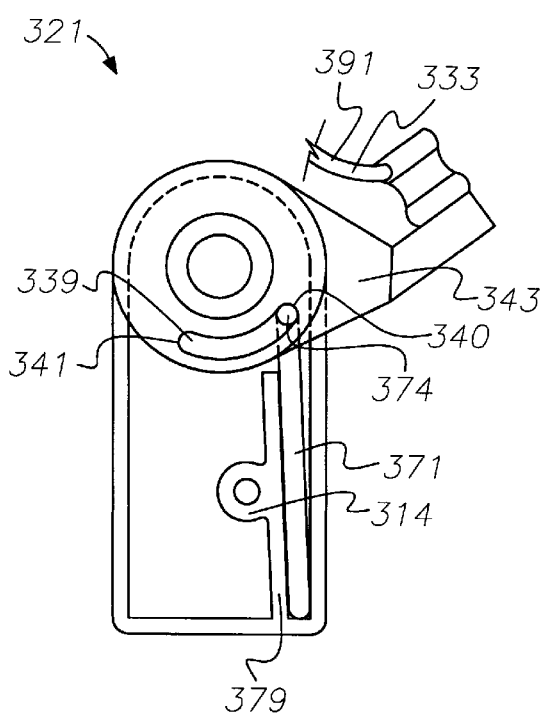
FIG. 10c is a front view of the second rotor arm having the bail bias assembly mechanism of a fourth preferred embodiment of the invention in the open casting position.
Figure 10D:
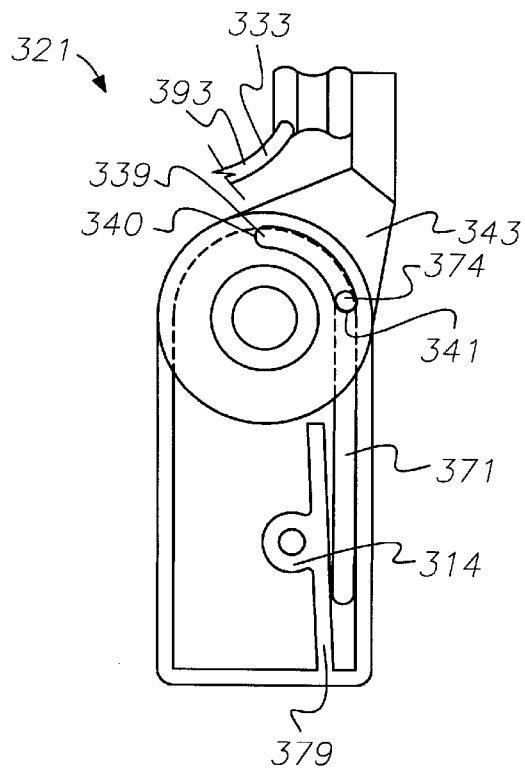
FIG. 10d is a front view of the second rotor arm in the closed retrieval position.

Next, provided in the fishing reel of the third preferred embodiment is the bail trip mechanism. In operation, the pivotal movement of bail hinge 343 is transferred to banjo 357 through bail wire 333 in a conventional manner. The pivotal movement of the bail trip mechanism transferred to banjo 357 drives bail spring 359 from open casting position 391 past bias neutral point of the spring bias mechanism into closed retrieval position 393 bias of the bail wire assembly, as shown in FIGS. 10c and 10d. In closed retrieval position 393, the bail spring 359 then provides a tensile moment to maintain bail wire 333 in closed retrieval position 393. (See FIG. 10b & d.)

As shown in FIGS. 9 and 10, trip arm 371 is a rigid member having a first end having insert pin 374, and a second end having transfer arm 376. Bail hinge 343 is formed with radial cutout 339. Bail hinge radial cutout 339 has first and second opposite end surfaces 340 and 341. Trip arm 371 is assembled to have insert pin 374 engaged within bail banjo radial cutout 339 and transfer arm 376 passing through cavity 327 of rotor arm 321, positioning transfer arm 376 proximate to reel forward body plate 380. (See FIG. 9.)

FIG. 10c shows bail wire assembly held in open casting position 391. Banjo 357 is pivotally biased by bail spring 359. Said pivotal bias is passed through bail wire 333 to bail hinge 343 to press bail hinge radial cutout surface 340 downward against trip arm insert pin 374 to hold the bail wire assembly in open casting position 391.

As rotor 307 is turned in a conventional manner, cam trip 384 engages transfer arm 376 to urge trip arm 371 in an upward direction to press trip arm insert pin 374 against radial cutout surface 340 to urge bail hinge 343 into pivotal rotation. As the pivotal movement of bail hinge 343 is transferred to banjo 357 through bail wire 333, banjo 357 is forced to pivot and rotor arm hole 317 passes bias neutral point whereupon bail spring 359 takes over the pivotal bias and urges banjo 357 into closed retrieval position 393. (See FIG. 10*a, b, c,* & *d.*)

The positions of the bail wire bail assembly bias mechanism and bail trip mechanism may be reversed. When bail hinge 343 is shaped to have the same spring engaging hole as banjo 357, and rotor arm 321 is shaped to have the same spring engaging hole as rotor arm 309, the bail wire bias assembly mechanism of rotor arm 309 may be placed in rotor arm 321 and not rotor arm 309. When banjo 357 is shaped with the radial cut of bail hinge 343 and rotor arm 309 is shaped with cavity 327 of rotor arm 321, the bail trip mechanism of rotor arm 321 may be place in rotor arm 309 and not rotor arm 321.

Otherwise, the configuration and assembly of the fourth preferred embodiment is substantially the same as the second preferred embodiment. Reference, therefore, should be made to the description of the second preferred embodiment.

DETAILED DESCRIPTION OF A FIFTH PREFERRED EMBODIMENT

Figure 6B:
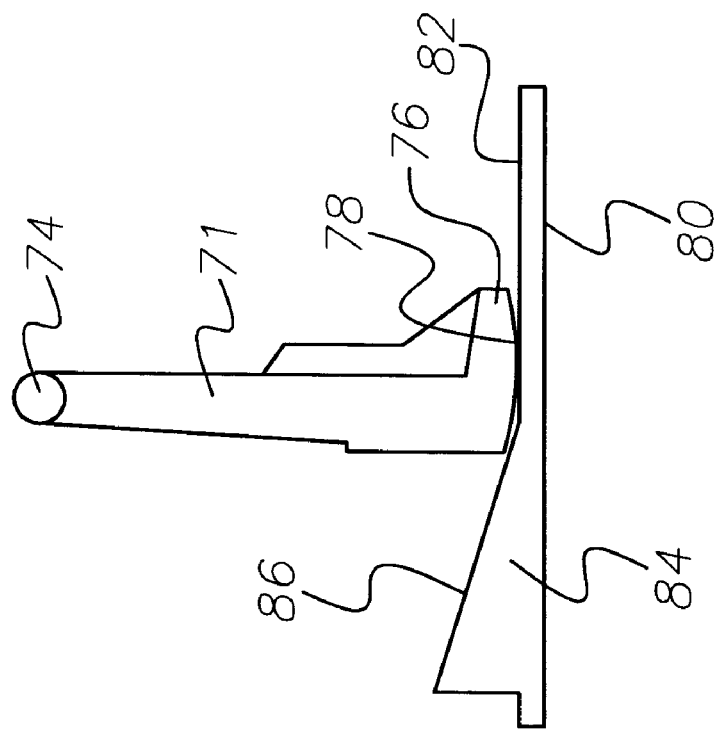
FIG. 6b is a side view of the non-conventional reel forward plate of a fifth preferred embodiment of the invention and an associated trip arm.

Reel forward body plate 80 has trip cam 484 which is shaped to have first cam face 486 and second cam face 488 to permit bail trip function in either direction of rotor rotation. (See FIG. 6*b*.) Cam faces 486 and 488 may have different ramp shapes to provide different trip functionality between the two directions of rotor rotation. A conventional reel forward body plate has a slider face and trip cam having only one cam face providing trip functionality in only one direction of rotor rotation. (See FIG. 6*a*.) Forward body plate 480 is integral to reel body 1 in a conventional manner. (See FIG. 1.) As the rotor is turned in a conventional manner, transfer arm 76 of trip arm 71 engages trip cam 84 at slider face 82.

All embodiments of this invention function with the reel forward body plate having two cam faces of this fifth embodiment of the invention.

SUMMARY

With respect to the above description then, the optimum dimensional relationships for the parts of the invention, to include variations in size, materials, shape, form, function and the manner of operation, assembly and use, are readily apparent and obvious to one skilled in the art. Accordingly, all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, the invention is not limited to the exact construction and operation shown and described. Therefore, all suitable modifications and equivalents which may be resorted to fall within the scope of the invention.

What is claimed is:

1. A fishing reel having an improved tension bail mechanism, comprising:

a reel body having a main gear journalled therein, a crank attached to said main gear, a pinion rotatably mounted in said reel body, said pinion engaging said main gear such that said pinion rotates as a fisherman turns the crank, a rotor, said rotor fixed to said pinion to rotate therewith, said rotor having a central axis;

said rotor having a first and a second rotor arm attached to said rotor, a bail wire assembly pivotable relative to said first and second rotor arms between a first closed retrieving position and a second open casting position, comprising, a first hinge means, said first hinge means pivotally attached to said first rotor arm, said first hinge means having an outermost face relative to said central axis of said rotor, a second hinge means, said second hinge means pivotally attached to said second rotor arm, and a bail wire extending between said first and second hinge means, a bail wire assembly bias mechanism, having a bias neutral point, comprising:

a tension spring, said tension spring having a first end and a second end, said first end of said tension spring attached to said first rotor arm, said second end of said tension spring attached to the outermost face of said first hinge means such that said tension spring applies a tensile moment to said first hinge means thereby biasing said bail wire assembly in either said first closed retrieval position or said second open casting position, and a bail trip means, wherein said bail trip means operatively engages said first hinge means to drive said bail wire assembly from said open casting position to just past said neutral point of the bias mechanism such that said tension spring then drives said bail wire assembly to said closed retrieval position, when said crank is turned.

2. The fishing reel of claim 1 wherein said first hinge means is a bail banjo and said second hinge means is a bail hinge.

3. The fishing reel of claim 2 wherein said spring is a coil spring.

4. The fishing reel of claim 2 wherein said spring has a bend to permit positioning of said spring closer to the rotational center of said rotor and to permit a thinner overall construction of said rotor arm containing said spring.

5. The fishing reel of claim 1 wherein said first hinge means is a bail hinge and said second hinge means is a bail banjo.

6. The fishing reel of claim 5 wherein said spring is a coil spring.

7. The fishing reel of claim 5 wherein said spring has a bend to permit positioning of said spring closer to the center of said rotor and to permit a thinner overall construction of said rotor arm containing said spring.

8. The fishing reel according to claim 1 wherein said reel body further has a forward body reel plate comprising a slider face, a first cam face, and a second cam face; wherein said first cam face and said second cam face engage said bail trip means and permit bail trip function in either direction of rotor rotation.

9. The fishing reel according to claim 8 wherein said first cam face has a first angle and said second cam face has a second angle, and further wherein said first angle and said second angle are not equal.

10. A fishing reel having an improved tension bail mechanism, comprising:

a reel body having a main gear journalled therein, a crank attached to said main gear, a pinion rotatably mounted in said reel body, said pinion engaging said main gear such that said pinion rotates as a fisherman turns the crank, a rotor, said rotor fixed to said pinion to rotate therewith, said rotor having a central axis;

said rotor having a first and a second rotor arm attached to said rotor, a bail wire assembly pivotable relative to said first and second rotor arms between a first closed retrieving position and a second open casting position, comprising, a first hinge means, said first hinge means pivotally attached to said first rotor arm, said first hinge means having an outermost face relative to the central axis of said rotor, a second hinge means, said second hinge means pivotally attached to said second rotor arm, a bail wire, said bail wire having first and second ends, said first end of said bail wire attached to said first hinge means, said second end of said bail wire attached to said second hinge means, said bail wire assembly is of unitary construction such that the pivotal movement of the first hinge is transferred to the second hinge means and that the pivotal movement of the second hinge means is transferred to the first hinge means;

a bail wire assembly bias mechanism, having a bias neutral point, comprising:

a tension spring, said tension spring having a first end and a second end, said first end of said tension spring attached to said first rotor arm, said second end of said tension spring attached to the outermost face of said first hinge means such that said tension spring applies a tensile moment to said first hinge means thereby biasing said bail wire assembly in either said first closed retrieval position or said second open casting position, a bail trip means, wherein said bail trip means operatively engages said second hinge means to drive said bail wire assembly from said open casting position to just past said neutral point of the bias mechanism such that said tension spring then drives said first hinge means to said closed retrieval position, when said crank is turned.

11. The fishing reel of claim 10 wherein said first hinge means is a bail banjo and said second hinge means is a bail hinge.

12. The fishing reel of claim 11 wherein said spring is a coil spring.

13. The fishing reel of claim 11 wherein said spring has a bend to permit positioning of said spring closer to the center of said rotor and to permit a thinner overall construction of said rotor arm containing said spring.

14. The fishing reel of claim 10 wherein said first hinge means is a bail hinge and said second hinge means is a bail banjo.

15. The fishing reel of claim 14 wherein said spring is a coil spring.

16. The fishing reel of claim 14 wherein said spring has a bend to permit positioning of said spring closer to the rotational center of said rotor and to permit a thinner overall construction of said rotor arm containing said spring.

17. The fishing reel according to claim 10 wherein said reel body further has a forward body reel plate comprising a slider face, a first cam face, and a second cam face; wherein said first cam face and said second cam face engage said bail trip means and permit bail trip function in either direction of rotor rotation.

18. The fishing reel according to claim 17 wherein said first cam face has a first angle and said second cam face has a second angle, and further wherein said first angle and said second angle are not equal.

* * * * *

UNITED STATES PATENT AND TRADEMARK OFFICE
CERTIFICATE OF CORRECTION

PATENT NO : 5,988,546
DATED : November 23, 1999
INVENTOR(S) : John Newton Young

It is certified that an error appears in the above-identified patent and that said Letters Patent are hereby corrected as shown below:

At Column 7, line 65: "is place" should read –is placed–.

At Column 8, line 27: "In actual use" should begin a new paragraph.

At Column 8, line 66: "cam trip" should read –trip cam–.

Signed and Sealed this

Twenty-seventh Day of June, 2000

Attest:

Q. TODD DICKINSON

Attesting Officer          Director of Patents and Trademarks